(12) United States Patent
Wilson

(10) Patent No.: US 6,852,239 B2
(45) Date of Patent: Feb. 8, 2005

(54) ENERGY-EFFICIENT DUCT, HEAD CELL WITH DUCT AND METHODS

(76) Inventor: George E. Wilson, 2363 NE. Stephanie Ct., Hillsboro, OR (US) 97124

(*) Notice: Subject to any disclaimer, the term of this patent is extended or adjusted under 35 U.S.C. 154(b) by 0 days.

(21) Appl. No.: 10/627,566

(22) Filed: Jul. 24, 2003

(65) Prior Publication Data
US 2004/0016688 A1 Jan. 29, 2004

Related U.S. Application Data

(62) Division of application No. 09/712,693, filed on Nov. 13, 2000, now Pat. No. 6,645,382.

(51) Int. Cl.[7] .......................... B01D 21/26; B01D 45/00; C02F 1/00
(52) U.S. Cl. ...................... 210/788; 210/787; 210/800; 210/802; 210/804; 209/12.1; 209/725
(58) Field of Search .............................. 210/137, 512.1, 210/519, 522, 532.1, 787, 788, 800, 802, 804; 209/12.1, 725

(56) References Cited

U.S. PATENT DOCUMENTS

| | | |
|---|---|---|
| 2,967,618 A | 1/1961 | Vane |
| 3,406,825 A | 10/1968 | Schouw |
| 3,745,752 A | 7/1973 | Gallaer |
| 3,879,296 A | 4/1975 | Schneider |
| 3,962,084 A | 6/1976 | Nussbaum |
| 4,031,006 A | 6/1977 | Ramirez et al. |
| 4,107,038 A | 8/1978 | Weis |
| 4,146,468 A | 3/1979 | Wilson |
| 4,259,180 A | 3/1981 | Surakka et al. |
| 4,270,676 A | 6/1981 | Green |
| 4,519,907 A | 5/1985 | Rooney |
| 4,576,720 A | 3/1986 | Mandt |
| 4,622,132 A | 11/1986 | Chupka |
| 4,652,363 A | 3/1987 | Miller |
| 4,759,854 A | 7/1988 | Wilson |
| 4,767,532 A | 8/1988 | Weis |
| 4,790,666 A | 12/1988 | Koziol |
| 4,848,991 A | 7/1989 | Bielefeldt |
| 4,960,525 A | 10/1990 | Dalby et al. |
| 4,983,294 A | 1/1991 | Lamb |
| 5,116,488 A | 5/1992 | Torregrossa |
| 5,298,172 A | 3/1994 | Smith |
| 5,407,584 A | 4/1995 | Broussard, Sr. |
| 5,422,017 A | 6/1995 | Felder et al. |
| 5,470,489 A | 11/1995 | Felder et al. |
| 5,630,936 A | 5/1997 | Oyzboyd |
| 5,658,076 A | 8/1997 | Crump et al. |
| 5,788,848 A | 8/1998 | Blanche et al. |
| 5,882,530 A | 3/1999 | Chase |
| D415,182 S | 10/1999 | Rogers et al. |

OTHER PUBLICATIONS

Wilson, George E., "Boundary Layer Clarification," 1997.
Wilson, George E., "Full–Scale Grit Collection Efficiency Comparison," 66th Annual PNPCA Conference (Nov. 2, 1999, Bellevue, Washington).
Eutek Systems, HC™ Enhanced Headworks Grit Concentrator, shown at http://www.eutek.com/brochures/hc_enhanced_headworks_grit_conce.htm.
Eutek Systems, HC™ Enhanced Headworks Grit Concentrator brochure (4 pages), 1998.

Primary Examiner—David A. Reifsnyder
(74) Attorney, Agent, or Firm—Klarquist Sparkman, LLP

(57) ABSTRACT

A duct for conveying influent to a head cell having multiple, vertically aligned trays has an inlet end and an outlet end. The inlet end can be connected to an influent channel positioned at a level above the head cell apparatus. The outlet end is positioned downstream of the inlet end and can be connected to the head cell. The outlet end has multiple, discrete nozzles that are spaced apart in a vertical direction and correspond in number to the multiple trays. Influent that enters the inlet end of the duct travels downwardly and exits the duct through orifices in the nozzles, entering each of the respective trays.

10 Claims, 5 Drawing Sheets

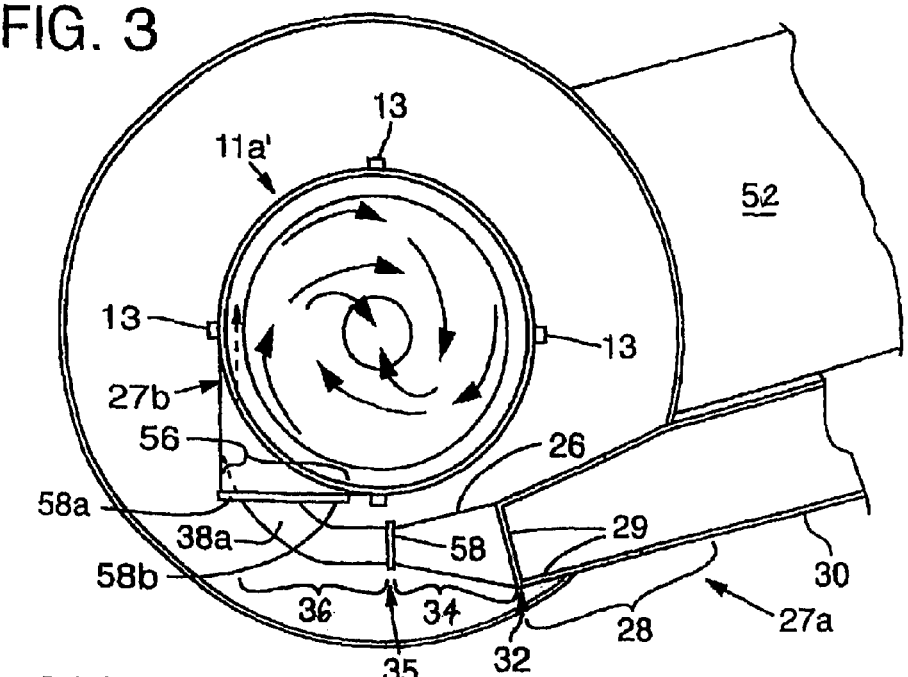
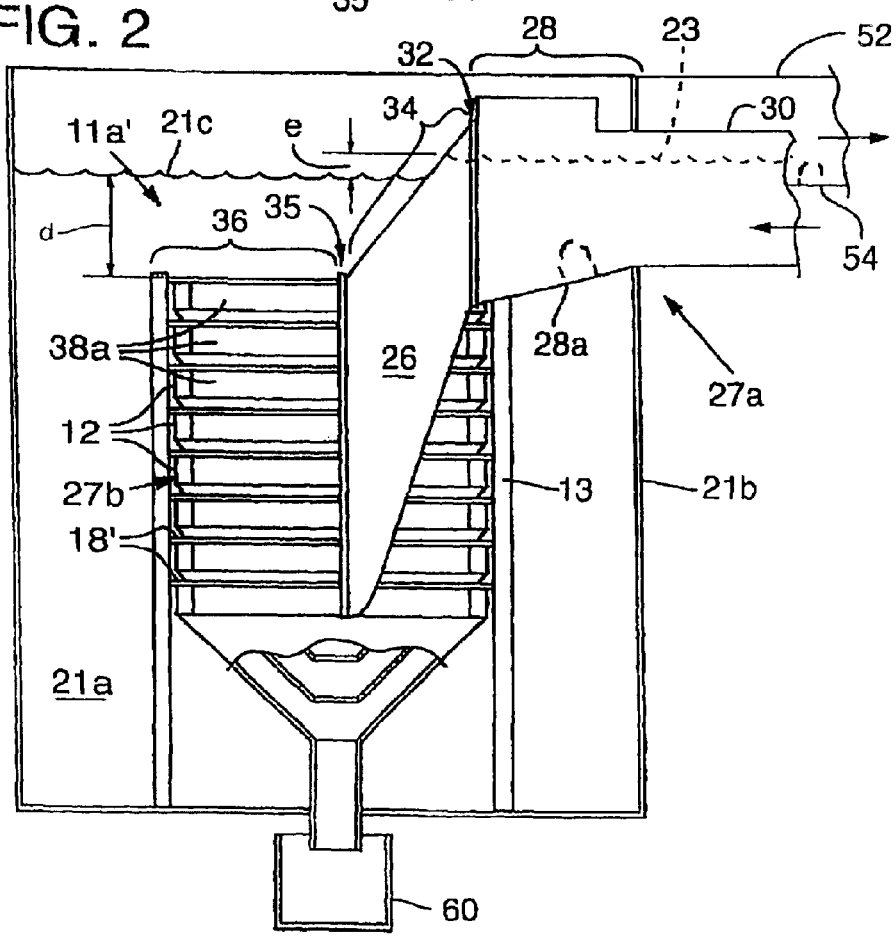

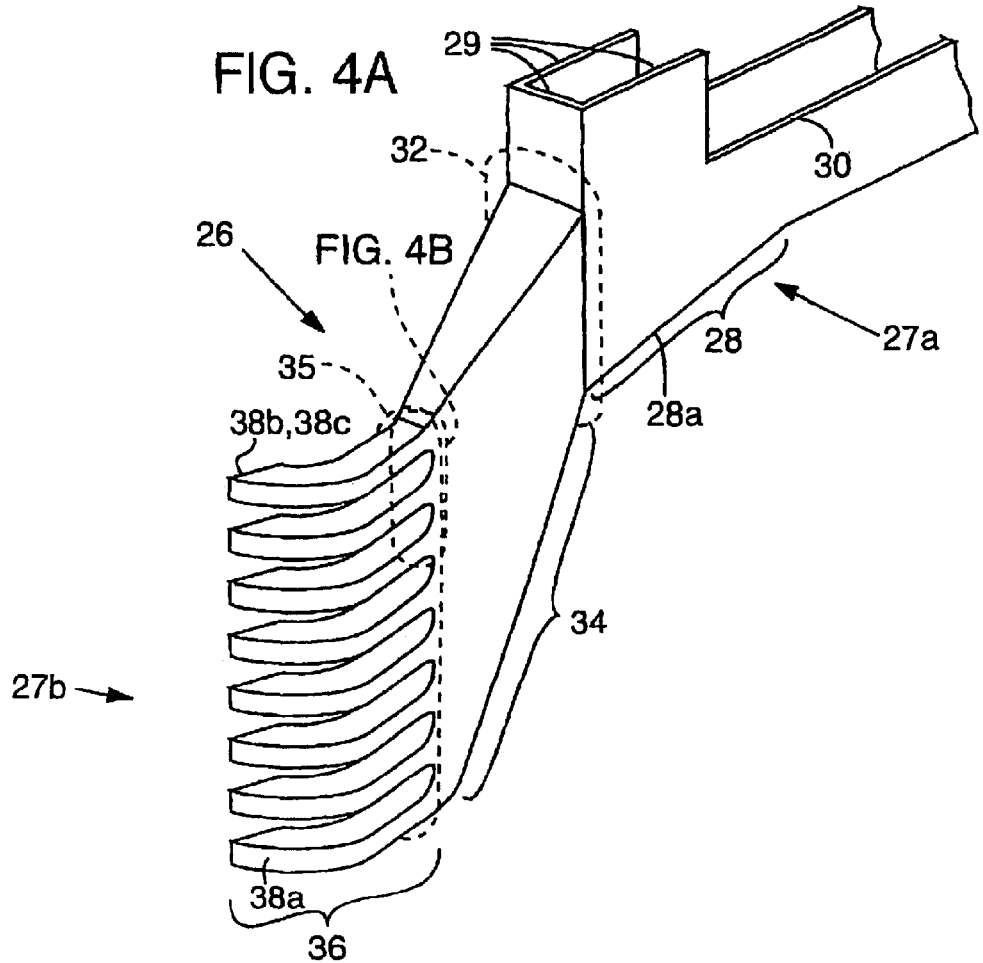
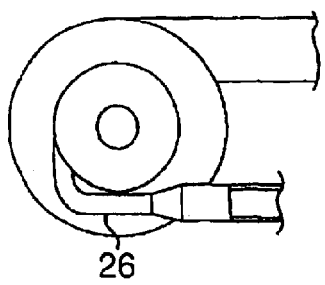
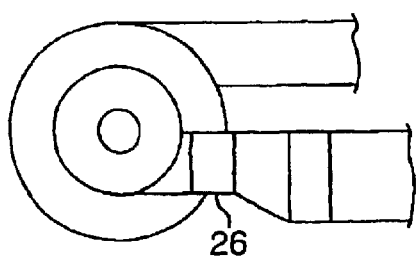
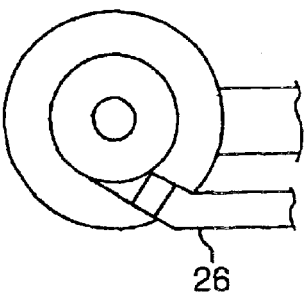
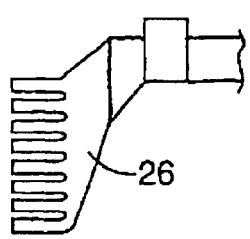
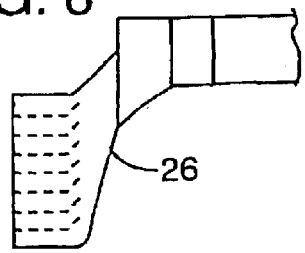

ENERGY-EFFICIENT DUCT, HEAD CELL WITH DUCT AND METHODS

RELATED APPLICATIONS

This is a U.S. Divisional application which claims priority from U.S. application Ser. No. 09/712,693, filed Nov. 13, 2000, now issued as U.S. Pat. No. 6,645,382 B2. The prior U.S. application Ser. No. 09/712,693 is incorporated herein by reference.

BACKGROUND

The present invention relates to a head cell apparatus used in wastewater treatment, and in particular, to an energy-efficient duct and methods used for conveying wastewater to be treated (i.e., influent) to the head cell.

One phase of wastewater treatment is separating "grit," which is high-density, inorganic, settleable particles, from the influent. Grit causes wear to downstream treatment equipment and, if it accumulates, loss of performance.

One type of apparatus used for separating grit from influent is referred to as a head cell. Other approaches to removing grit have involved the use of a horizontal mechanically rotating element (e.g., a paddle or propeller) that circulates the influent within a surrounding cylindrical tank to separate the grit from the influent and cause it to gather in an accumulating well. By way of contrast, head cells separate grit by a continuous hydraulic action and do not require any mechanically-induced motion. Head cells are also self-cleaning.

Using a mechanically rotating element is disadvantageous because the periodic nature of its rotation creates turbulence that tends to re-suspend finer grit. Also, larger objects that are typically found in an influent flow, such as rags, as one example, can accumulate and "bridge" operating areas in the well. In this case, such an apparatus must then be drained, cleaned and/or repaired, which results in decreased treatment efficiency and increased operating costs.

The hydraulic separation action in a head cell occurs through controlling the influent to flow at predetermined speeds and along a predetermined course, and does not require the use of chemicals. The influent enters at the periphery or rim of a funnel-like conical surface from a direction tangential to the rim, and then flows over and around the downwardly sloping conical surface, at least partially circling a centrally located opening. The flow conditions are determined such that a dynamic boundary layer is developed at the conical surface.

As the influent flows around the downwardly sloping conical surface, the grit is separated out onto the conical surface. At the same time, the remaining liquid, i.e., the effluent (which is relatively grit-free wastewater) is guided to flow out of the head cell through openings located at the outer periphery of the conical surface. In general, this effluent is channeled for further treatment downstream, e.g., as primary sludge.

At the same time, the separated grit moves downwardly along the sloping conical surface and through the opening for collection at a point beneath the opening. A head cell may have several individual conical surfaces or "trays" that are vertically aligned with each other such that grit draining through the central opening in an upper tray also passes through similar central openings in all lower trays. In a typical head cell having vertically aligned or "stacked" trays, a greater working surface area is provided relative to the head cell's footprint than for comparably sized equipment having a single chamber with a mechanically rotating element.

In some head cell installations, referred to herein as "upward feed head cells," the influent is pumped vertically upward such that each of the stacked trays, in succession from a bottom tray to a top tray, receives an amount of the influent through a peripheral inlet. The energy requirement of this arrangement can be high due to the loss of influent velocity head and the necessity of additional head to generate a suitable velocity in the peripheral inlet. In many installations, however, available head is limited, making this arrangement impractical.

Some wastewater treatment installations were originally implemented without grit removal equipment positioned upstream of the primary sludge treatment equipment. Retrofitting such installations with grit removal equipment is desirable to eliminate or at least reduce the amount of grit in the primary sludge before it enters the primary treatment equipment. Given the floor space constraints in existing installations, head cell equipment is often favored because it has a far superior capacity to remove grit (as great as 10 times more) per unit area of the equipment's footprint than the mechanically rotating element design. These retrofit installations, however, often have the same energy limitations that prevent use of an upward feed head cell.

SUMMARY

New methods and associated apparatus are provided for operating a treatment apparatus, e.g., a head cell, with improved performance and efficiency. Influent is fed downwardly to a head cell, which decreases the head cell operating energy (i.e., head) requirement and increases efficiency. Because the new method requires less head, the head cell can now be used in situations with low available head that were previously restricted to mechanically rotating element equipment. Head cells provide superior performance over mechanically rotating element equipment by removing smaller size grit and removing a higher percentage of grit in all other larger size ranges.

A new energy-efficient passageway member or duct is provided that directs influent downwardly to distribute it at multiple levels of a head cell, from the top down. The new duct substantially minimizes head losses and preserves the required flow conditions for proper operation of the apparatus. The duct reduces and may eliminate, in some cases, the excess energy requirement for upward feed head cells in which the influent is pumped in an upward vertical direction.

According to some implementations, the duct directs or feeds a single flow from a higher level downwardly and into multiple flows at lower levels substantially without any head loss. Influent may be directed from a higher level to each of the multiple trays of a head cell that are positioned at lower levels without requiring an additional energy input, e.g., to pump the influent or to power a grit-removing mechanically rotating element. Within a given energy limit, a head cell provides superior performance because of its greater working surface area (i.e., the combined area of the multiple trays) per unit area of footprint than the working surface area of a mechanically rotating element system having a comparable footprint. The working surface area of a mechanically rotating element system is limited to a portion of the inner planar surface of the cylindrical tank.

In commonly encountered retrofit situations, the lower performance of mechanically rotating element equipment, sometime referred to as a gravity grit chamber, would prevent removal of fine grit from the system's effluent before it enters other downstream processing equipment, e.g., primary treatment equipment. The remaining fine grit causes undesirable wear. In the same situations, however, a downwardly fed head cell removes substantially all of the fine grit.

The duct has an inlet end that is positioned higher than the outlet end such that influent will flow downwardly to the outlet end. The outlet is divided into multiple, individual nozzles that are vertically separated from each other. The nozzles terminate in openings or orifices through which a portion of the influent is directed to each corresponding individual tray of the head cell.

The outlet end of the duct is positioned to direct the influent flowing through the duct into the head cell from a direction generally tangential to the periphery of each tray.

The duct may have various sections along its length from the inlet end (i.e., where raw influent is received, e.g., from an open channel, to the outlet end (i.e., where the duct joins the head cell). The duct may have a first section in which the velocity of the influent flow is changed as necessary (e.g., by changing a cross-section of the first section), a second section that drops from a higher level to a lower level and has a constant cross-section, and a third section in which the influent is distributed into multiple nozzles, which may be at different levels.

With the duct, influent is conveyed from a source at a higher level to multiple lower levels, and the velocity of each multiple flow where it enters the treatment apparatus is maintained at a predetermined design velocity. As necessary, the duct is configured to initially change the influent velocity to match the design velocity, and the influent is then maintained at this design velocity throughout the remaining downstream length of the duct. Advantageously, the influent is conveyed from the source to the treatment apparatus substantially without any head loss.

Recitation of any aspect in this Summary of the Disclosure is not intended to imply that the aspect is an essential element. The Summary is instead provided to facilitate understanding of the following detailed description.

BRIEF DESCRIPTION OF DRAWINGS

FIG. 2 is a side view of a head cell apparatus with a new energy-efficient duct for conveying influent to the head cell in a downward direction.

FIG. 3 is a top plan view of the head cell apparatus of FIG. 2.

FIG. 4A is a perspective view of the duct shown in FIG. 2.

FIG. 5 is a schematic top plan view of a head cell apparatus with a wrapped entry duct.

FIG. 6 is a schematic side view of the duct of FIG. 5.

FIG. 7 is a schematic top plan view of a head cell apparatus with a straight entry duct.

FIG. 8 is a schematic side view of the duct of FIG. 7.

FIG. 9 is a schematic top plan view of a head cell apparatus with an angled entry duct.

DETAILED DESCRIPTION

As described below, new methods and apparatus provide for operating a treatment apparatus with improved performance and efficiency. In specific implementations, the wastewater treatment apparatus is a head cell that removes grit from influent at an initial stage before the resulting effluent from the head cell is subjected to subsequent treatment. Efficient grit removal requires achieving particular flow conditions in the head cell, which also implicates the design of the duct leading to the head cell.

Grit and Grit Removal

Removing grit from influent before subsequent treatment can help alleviate two problems: (1) wear (especially of rotating parts), and (2) deposition and accumulation of grit that leads to loss of performance. As used herein, "grit" refers to inorganic, settleable solids that are denser than water (i.e., having a specific gravity greater than 1.0). Grit includes both particles that travel along the bottoms of pipes, channels, ducts, etc., and particles that are suspended within the influent.

Unlike organic particles, which may be broken down in a downstream biochemical process, inorganic particles tend to remain abrasive, thus contributing to the wear problem unless removed. Settleable refers to those particles that can be caused to settle for collection and removal under conditions existing in a typical wastewater treatment plant.

Such inorganic settleable particles have a settling velocity that is approximately equal to or greater than the settling velocity of a 50 micron particle of silica sand (sometimes expressed as "50 micron SES" (Sand Equivalent Size)). The settling velocity for a 50 micron SES particle in a quiescent tank is about 0.22 cm/sec. The settling velocity is a single parameter that allows the separability of particles having different specific gravities and sizes to be compared.

Conventional Head Cell Construction

Figure 1A:
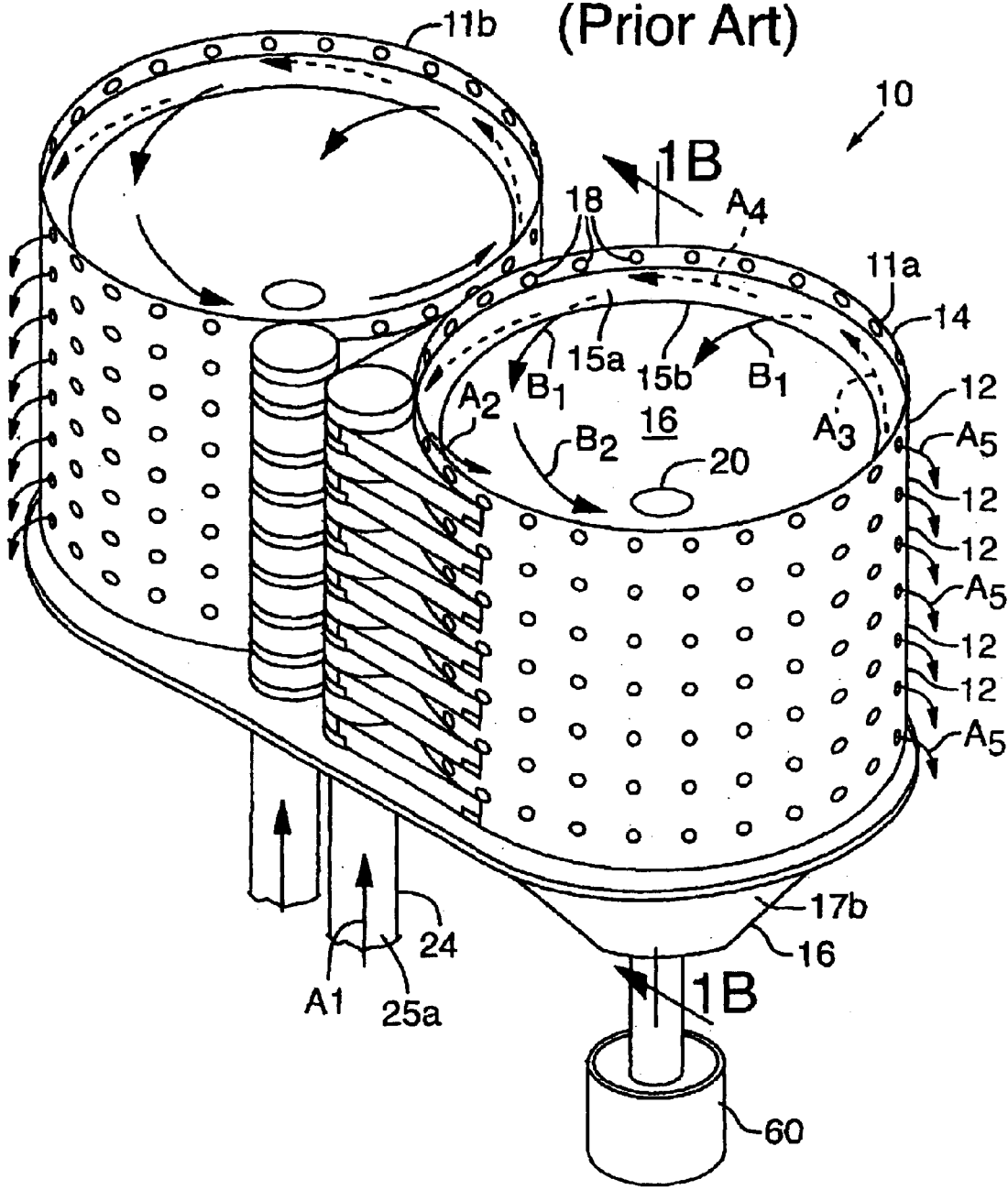
FIG. 1A is a perspective view of a conventional head cell installation having two head cell apparatus that each have a vertical influent pipe through which influent is directed upwardly into multiple trays.

A conventional head cell installation 10 is shown in FIG. 1A. The conventional head cell installation 10 operates with an upward feed, and thus has an excess energy requirement.

The illustrated installation 10 has two head cell apparatus (or "head cells") 11a, 11b that operate independently of each other, but are placed adjacent each other as shown. The left side head cell 11b has the same general construction and operation as the right side head cell 11a, which is described in detail below.

Figure 1B:
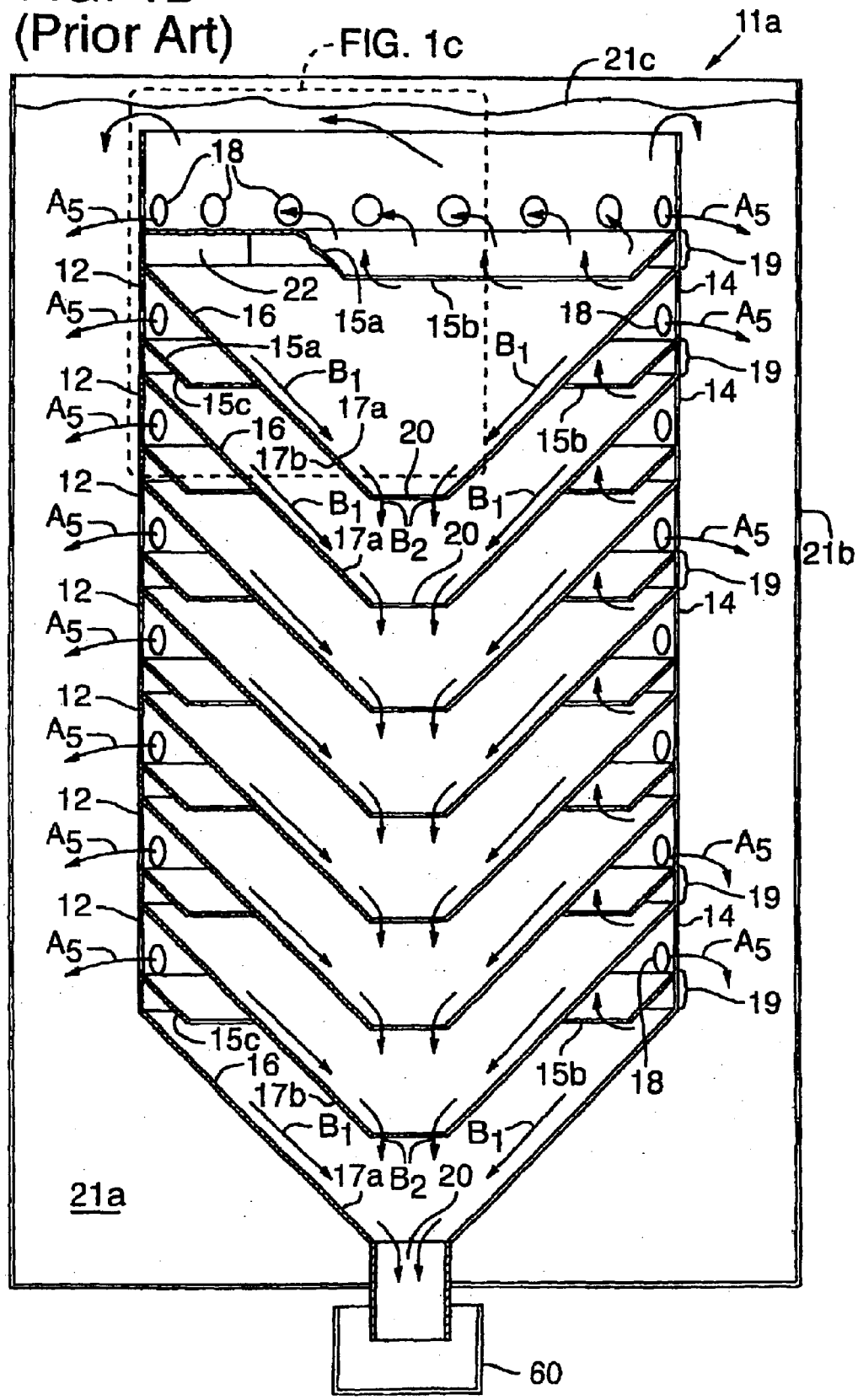
FIG. 1B is a side sectional view of the right side head cell apparatus taken along the line 1B—1B in FIG. 1A, showing the paths of the influent, separated grit and effluent through the multiple trays, with the head cell apparatus shown submerged in a surrounding vessel.

Referring to FIGS. 1A and 1B, the head cell 11a has a number of trays 12 (eight in this example) that are nested together. Depending upon the particular application, a greater or lesser number of trays can be used. Each of the trays 12 has a circular rim 14 joined to a downwardly directed conical section 16 having a central grit exit opening 20. The conical section 16 has an inner sloping surface 17a and an outer sloping surface 17b (visible for the bottom tray 12). The inner sloping surface 17a of each tray 12 is spaced apart from the outer sloping surface 17b of the immediately overlying tray 12, if any. The circular rim 14 of each tray 12 has a series of spaced effluent exit openings 18.

Referring to FIG. 1B, each tray 12 also has an annular-shaped baffle 15a extending inwardly and downwardly from the circular rim 14 with a large, central baffle opening 15b. The baffle 15a is spaced above the respective conical surface 16, but below the level of the effluent exit openings 18, thereby defining an influent circulation space 19 for the respective tray 12 between the inner sloping surface 17a and an outer sloping surface 15c of the baffle 15a. In the illustrated example, the baffle 15a extends downwardly at approximately the same angle as the conical section 16.

When multiple trays 12 are stacked together in alignment with each other as shown, the baffle openings 15b and the grit exit openings 20 of the trays 12 are vertically aligned, as best seen in FIG. 1B.

Figure 1C:
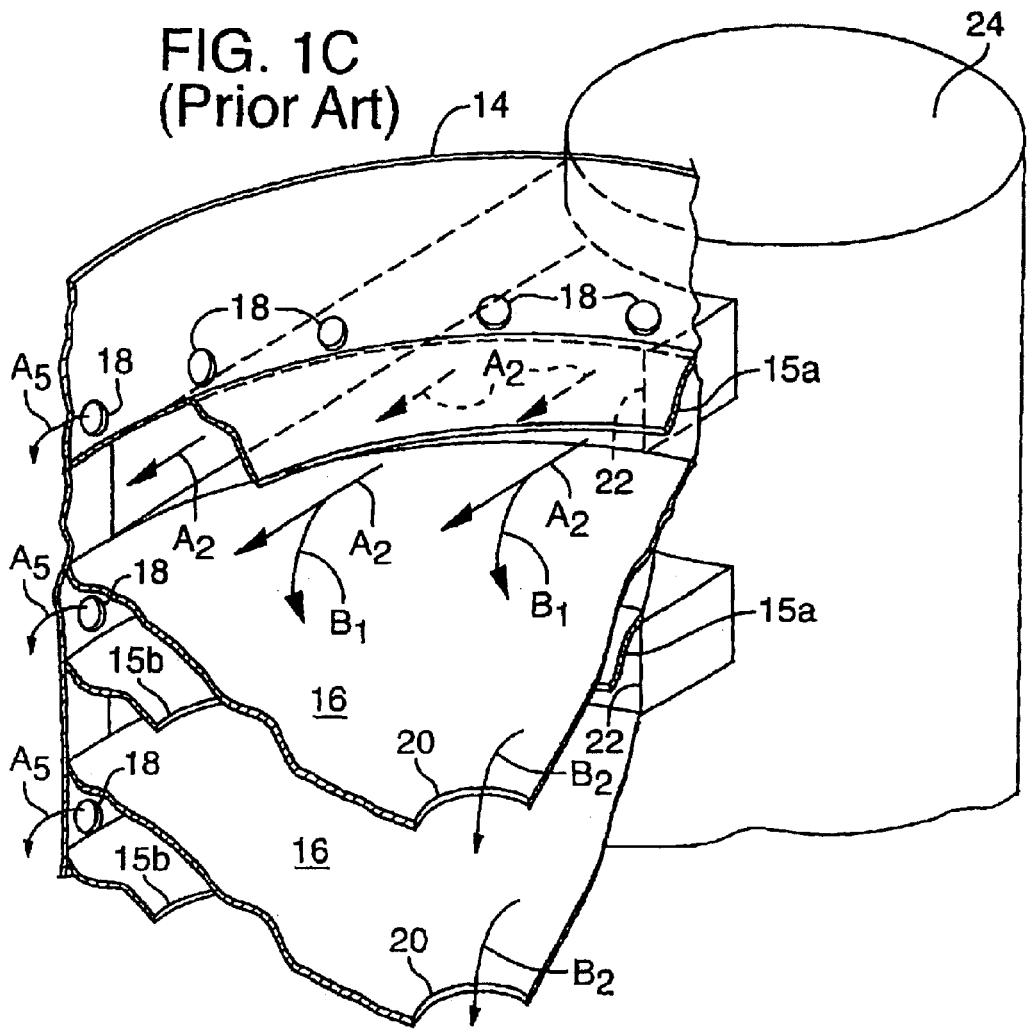
FIG. 1C is a partial perspective sectional view taken from the region 1C in FIG. 1B showing portions of the top three trays and the paths of the influent entering through influent openings into the trays.

Referring to FIGS. 1B and 1C, each of the trays 12 also has a peripheral 110 influent entry opening 22 formed in the circular rim 14. As shown for the top tray 12 in FIG. 1B, which has a portion of the baffle 15a removed for clarity, the influent opening 22 is approximately rectangular in cross-section. The influent opening 22 is positioned in the rim 14 between the baffle 15a and the conical section 16 (i.e., within the influent circulation space 19 for the respective tray 12). Two such influent openings 22 are shown in FIG. 1C for the top two trays 12.

Each tray 12 receives a portion of the influent flow travelling upward through the vertical influent pipe 24 via the respective influent entry opening 22. As shown in FIG. 1A, the vertical influent pipe 24 has an inlet 25a that receives influent to be treated, e.g., by a connection to a pipe (not shown) located at a level below the lowest tray 12.

Head Cell Operation

In operation, the head cell apparatus 11a is submerged within a surrounding chamber 21a defined by a vessel wall 21b (FIG. 1B) such that an upper surface 21c of head cell effluent in the chamber 21a is above the level of the top tray 12.

Referring to FIG. 1A, the influent, which can be assumed to have a uniform distribution of grit, is directed vertically upward through the inlet 25a and the vertical influent pipe 24 (arrow A1 in FIG. 1A). As the influent flows upwardly, portions of it are successively distributed through the influent openings 22 to each of the respective trays 12.

The influent enters each of the trays 12 in a generally tangential direction (arrow A2 for the top tray 12), and begins to follows the inner periphery of the circular rim 14 within the influent circulation space 19 beneath the baffle 15a. This flow, which is referred to as a primary flow, establishes a circular path (dashed arrows A3 and A4).

As the primary flow circulates around the conical surface 16, a dynamic boundary layer is established at its inner extent in a circular pattern surrounding the center of the conical section 16. This boundary layer induces a secondary flow leading toward the grit exit opening 20. Heavier grit particles become subject to the secondary flow upon entry into the tray 12, and are led by this flow through the grit exit opening 20. Lighter grit particles begin to circulate around the influent circulation space with the primary flow, but, due to gravity, eventually settle onto the conical surface and become subject to the secondary flow.

As the influent flows in this manner, grit is separated out from the influent and onto the inner surface 17a of the conical section 16 of each of the trays 12 (arrow B1). Referring to FIG. 1B, the separated grit travels downwardly through the grit exit opening 20 of the respective tray, and any underlying trays (arrows B2), and is collected in a grit collection chamber 60 at the bottom of the head cell 11a.

Meanwhile, the circulating influent, from which grit has been removed, is discharged from each of the trays 12 as effluent. The effluent is discharged through the respective effluent exit openings 18. After circulating partway around the tray 12, the effluent flows upward from the influent circulation space 19, through the respective baffle opening 15b and over the baffle 15a, before exiting through the effluent exit openings 18 (see arrows for the top tray in FIG. 1B).

This upward flow is the result of the primary flow in the circular direction and the secondary flow in the downward direction. The influent flow entering the head cell 10 (through the influent openings 22 in the trays 12) becomes the effluent flow following an upward path until it is discharged from the head cell through the openings 18.

After the effluent is discharged, it is then directed elsewhere for subsequent treatment or collection, as desired. In a typical head cell, the tray flow energy requirement or head loss due to its operation is about 6 in.

Head Cell Operating Conditions

In the illustrated example, the energy required to elevate the influent upward from a level beneath he head cell 11a and through the vertical influent pipe 24 to the head cell.(i.e., the pump energy) may be 12 in. head (measured in water) or more. In certain cases, e.g., with open channel flow, it may not be possible to provide sufficient energy to elevate the influent economically. Therefore, it would be desirable to reduce the energy required to introduce the influent into the head cell 11a, yet still maintain at least about 6 in. head required for head cell operation.

In operating head cells for a typical municipal wastewater facility, velocities for influent at points where the influent enters the trays 12 (i.e., near the influent openings 22) may be from 1 ft./sec. to 10 ft./sec. In a head cell in which the conical surfaces 16 are sloped at approximately 45 degrees, premature settling may be observed at inlet velocities of less than about 5 ft./sec. It has been observed that inlet velocities of about 5 ft./sec. provide an adequate scour flow and sufficient settling performance in such a head cell. Inlet velocities above 5 ft./sec. allow improved scour flow, but require greater than 6 in. head.

New Head Cell Entry Duct

A new head cell entry duct can be used to channel influent from a level above the head cell (e.g., from an open channel) to each of the individual trays of the head cell in a way that provides sufficient energy and maintains suitable flow conditions for removing grit from influent. In contrast to the upward feed head cell, in which the influent flow entering the head cell is directed vertically upward, the influent flow with the new duct is fed downwardly.

FIGS. 2–4B show a head cell entry duct 26 according to a specific implementation. In FIGS. 2 and 3, the head cell entry duct 26 is shown mounted to a head cell 11a, which is similar to the head cell apparatus 11a, except the effluent exit openings 18' (shown for the bottom two trays) are peripheral spaces between the trays 12 (instead of the openings 18 in the periphery of each tray 12). The trays 12 are maintained in spaced alignment to each other by a surrounding framework 13.

In FIGS. 2 and 3, the head cell 11a' is also shown in its operating condition within the chamber 21b defined by the surrounding vessel or tank 21a. The topmost tray 12 is submerged below the surface 21c of effluent in the tank 21a. As shown by the dashed lines within the duct 26 in FIG. 2, a level 31 of the influent entering the head cell 11a' from an open channel 30 is above the surface 21c. As shown in FIG. 3, there is an exit duct 52 attached to the wall of the tank 21a by which the effluent exits the head cell 11a. A bottom surface 54 of the exit duct 52 is positioned at a level above the topmost tray 12.

The duct 26 has an inlet end 27a and an outlet end 27b. The inlet end 27a is adapted to connect to an influent supply, e.g., an open channel 30, that is at a level above the head cell 11a' (i.e., the surface of the influent in the channel 30 is above the top tray 12). The outlet end 27b has multiple discrete nozzles 38a that are arranged in the vertical direction to allow the duct 26 to be connected to the respective inlet opening 22 of each of the trays 12.

Influent is received into the duct 26 from the channel 30, and its velocity is changed to match a predetermined design velocity as it flows along the length of the duct 26. According to one aspect, the influent velocity is increased to match the predetermined design velocity, and this increased velocity is maintained substantially constant over the remaining length of the duct 26, including at downstream points where the flow is distributed into multiple flows and where the multiple flows enter the head cell.

Referring to FIGS. 2–4A, in a flow direction from the inlet end 27a downstream to the outlet end 27b, the duct 26 in the illustrated implementation has:

1. A first section (or adapter section) 28 extending downstream from the inlet end 27a;
2. A second section (or drop section) 34 extending downstream from the first section; and
3. A third section (or distribution section) 36 extending downstream from the second section and terminating in the discrete nozzles 38a at the outlet end 27b.

In the first section 28, influent is received from the influent source. In the case of the channel 30, the influent velocity in the channel 30 may be about 3 ft./sec. To meet the desired design velocity of about 5 ft./sec. at the influent openings 22, the influent velocity must be increased in the duct. (In other applications, the first section 28 may be designed to decrease the influent velocity to match the design velocity, or if the influent is already at the design velocity, to maintain it.)

In the specific implementation shown, as interior passageway defined by the first section 28 decreases in cross sectional area from the inlet end 27a to a first junction 32 with the second section 34. As shown in FIGS. 3 and 4A, the passageway of the first section 28 has an approximately rectangular cross-section that decreases in area at a substantially constant rate. Also, a bottom surface 28a of the first section 28 slopes downwardly at a slight angle. In the specific implementation, influent flowing through the duct 26 has a velocity of about 5 ft./sec. at the first junction 32.

In other implementations, the cross-section of the first section 28 may be constant or may increase in the downstream direction. If the influent velocity in the channel 30 is at the desired rate, the first section 28 is formed with a constant cross-section. If the influent velocity in the channel 30 is above the desired rate, the first section is formed with a cross-section that increases in the downstream direction.

The first section 28 can be partial or totally open (as shown) at its top surface. As shown in FIGS. 3 and 4A, the first section 28 can have side walls 29 that extend upward to a level above the channel 30 (to the upstream side) and above the second section 34 (to the downstream side). The walls 29 allow the first section 28 to accommodate surcharging (i.e., temporarily increased flow) from the channel 30.

Also, the open top surface of the first section 28 allows grease and other low density foreign matter in the influent, which tends to rise to the top surface of the influent, to be removed before it enters the head cell apparatus.

The second section 34 slants downwardly from the first junction 32 with the first section 28 such that a bottom surface of the second section 34 terminates at a height approximately level with the bottom tray 12. The second section 34 slants downwardly at a steep angle relative to the downwardly sloping bottom surface 28a of the first section 28.

The cross-section of a chamber defined by the second section 34 remains substantially constant in area, but changes in shape over the length of the second section 34. As illustrated in FIGS. 2 and 4, the cross-section of this chamber increases in vertical dimension and decreases in horizontal dimension from the junction 32 downstream to a second junction 35 where the second section joints the third section 36. The degree to which the cross-section of the chamber defined by the second section 34 changes in shape depends upon the steepness of the drop from the level of the first section 28 to the level of the bottom tray 12.

At the second junction 35 where the second section 34 joins the third section 36, the nozzles 38a begin. The nozzles 38a are substantially aligned in the vertical direction. Each nozzle 38a defines a chamber 38b having an approximately rectangular cross-section that remains substantially constant over its length and terminates in an orifice or opening 38c (FIG. 4B) at the outlet end 27b. In the implementation of FIGS. 2–4B, the chambers 38b are formed to curve approximately 90° in the horizontal plane. As indicated above, the orifices 38c are formed to have approximately the same size and shape as the inlets 22.

Thus, the total cross-sectional area of all of the orifices 38c is approximately equal to the cross-sectional area of the chamber defined by the second section 34 at the first junction 32 and all downstream points along is length. As a result, the velocity of influent at each of the orifices 38c/influent openings 22 is substantially equal to the velocity of the total influent flow at the junction 32.

In the area of the second junction 35, the third section 36 may be formed to have curved separation regions 39 defined at interior areas of the duct 26 between adjacent nozzles 38a. These separation regions 39 may include projections 40 formed in the walls of the duct 26 between adjacent nozzles 38a that extend outward into the flow in the upstream direction. These projections 40 smooth the distribution of the oncoming flow between the adjacent nozzles 38a. Because the projections 40 are rounded, they also inhibit objects in the influent from becoming lodged there in the spaces between the nozzles 38a under the force of the influent flow.

Figure 4B:
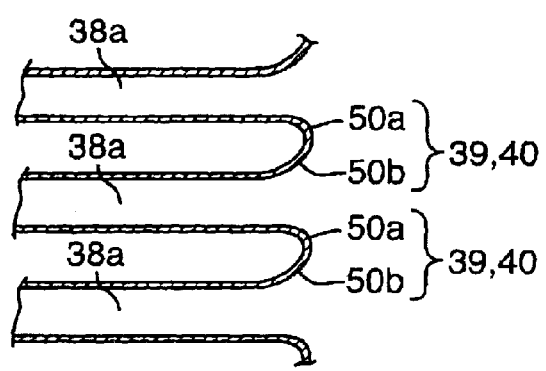
FIG. 4B is a magnified side view of a portion of the duct of FIG. 4A showing the separation regions between adjacent nozzles.

As shown in FIG. 4B, each projection 40 in a specific implementation has curved upper and lower sides 50a, 50b, respectively, with the upper side 50a being more curved than the lower side 50b. Specifically, the upper side 50a may have a curve with a radius of approximately 1 in. relative to the distance separating the adjacent nozzles 38a. Similarly, the lower side 50b may have a curve with a balancing, greater radius relative to the distance separating the nozzles 38a. These radii depend upon the nozzle-to-nozzle spacing and nozzle depth of any specific application.

In the side view of the head cell 11a' of FIG. 2, there is a gusset plate 59 formed at the second junction 35 and an adjacent outer skin that conceal the separation regions 39 from view.

Referring to FIG. 2, the topmost tray 12 of a specific implementation is submerged by a depth d below the surface 21c by about 3 ft. A level of influent 23 within the duct 26 near the inlet end 27a is a distance e above the surface 21c. In this implementation, the distance e is about 6 in.

In an exemplary application, the diameter of each tray 12 is approximately 9 ft., the diameter of each baffle opening 15b is approximately 7 ft., the diameter of each grit exit opening 20 is approximately 2 ft., and each baffle 15a and conical section 16 are sloped at an angle of about 45 degrees. Adjacent inlet openings 22 are spaced approximately uniformly in a vertical direction by about 1 ft. In the same example, the inlet openings 22/orifices 38c each have a cross-sectional area of about 12 square in.

The total drop in height from the inlet end 27a of the duct to the outlet end 27b can be set according to the particular requirements of a given installation (e.g., the height difference between the channel 30 and the head cell 11a, the available space in which to fit the duct 26, etc.). Similarly, the drops in height from the inlet end 27a to the first junction 32 and from the first junction 32 to the second junction 35 can also be set as required. As one example, referring to FIG. 2, these drops in height are about 6 in. from the inlet end 27a to the first junction 32 and about 3.5 ft. from the first junction 32 to the second junction 35. Of course, the specific drops in height will depend upon the number of nozzles and nozzle-to-nozzle spacing of the particular application.

New Head Cell Duct/Head Cell Performance

With a downward feed head cell, e.g., using the duct 26, performance is significantly improved. As described, in a downward feed head cell with a substantially loss-free duct, only as much as 6 in. head may be required for operation. This 6 in. head requirement is substantially due to head losses inherent in the operation of the head cell itself, and not from any losses due to conveying the influent to the head cell.

The head cell has a substantially greater working surface (i.e., the combined area of all of the trays) than the working surface of a conventional grit removal apparatus having a mechanically rotating element within a cylindrical chamber, which is just a portion of the inner surface of the chamber. Also, as opposed to continuous hydraulic action of the head cell, the cyclical action of the mechanically rotating element causes turbulence that re-suspends grit particles, thus lowering the efficiency of the conventional apparatus. For a given footprint, a head cell may provide ten times the grit removing capacity as a conventional apparatus. Stated differently, a head cell of a given foot print may be capable of or removing smaller grit particles (e.g., 50 micron SES), which are more difficult to remove, whereas a comparable conventional apparatus may only be capable of removing larger particles (e.g., 250–300 micron SES).

In addition, the downward feed head cell is also more efficient at removing grit for systems that experience wide fluctuations between Peak Wet Weather Flow (PWWF) and Average Dry Weather Flow (ADWF).

Miscellaneous Considerations

In the illustrated implementations, each section of the duct 26 has a rectangular cross-section, and each section is enclosed by a top surface or panel. Depending upon the particular requirements, some sections of the duct 26 may be configured to have other cross-sectional shapes, e.g., a circular or other form of curved cross-section.

As shown schematically in FIGS. 2–9, the duct 26 can be configured for wrapped entry (FIGS. 2–6), straight entry (FIGS. 7 and 8) or angled entry (FIG. 9). With a wrapped entry configuration as shown in FIG. 4A, the walls of the nozzles 38a must be curved such that the orifices 38c intersect the respective influent entry openings 22. As illustrated, the nozzles 38a follow a curve of approximately 90 degrees. As would be known to one of ordinary skill in the art, the particular configuration for the duct 26 would depend upon space limitations and relative geometrical considerations between the influent source and the associated treatment apparatus.

The duct 26 is designed for use with head cells of different sizes. Specifically, a particular duct configured for one head cell can be used with another head cell having the same number of trays, same tray spacing and same sized inlet openings. As shown for the head cell 11a' in FIG. 2, there is an adapter section 56 for each tray 12 to which the respective nozzle 38a is joined. The adapter section 56 defines a rectangular opening having a horizontal dimension approximately half of the diameter of the tray 12 and a height approximately equal to the height of the associated inlet opening 22. Adapter plates 58a, 58b are attached to the adapter section 56 at either side of the inlet opening 22 to cover and seal the remaining exposed space of the rectangular opening, thereby completing the junction between the duct 26 and the head cell 11a. For a different head cell as described above (i.e. a head cell having a different diameter), only the adapter plates 58a, 58b need to be changed.

In a specific implementation, the duct is formed of sheet metal. Alternatively, various other materials may be used, e.g., plastic or other suitable material. The trays 12 may be constructed of a hydrophobic material to resist grease accumulation. In a specific implementation the trays 12 are constructed of polyethylene.

Having illustrated and described the principles of our invention with reference to several preferred embodiments, it should be apparent to those of ordinary skill in the art that the invention may be modified in arrangement and detail without departing from such principles.

What is claimed is:

1. A method of conveying influent to a head cell having multiple trays aligned in a vertical direction, the method comprising:

providing an influent source at a first level above the head cell;

channeling influent from the influent source in a duct to the head cell at a second level lower than the first level;

changing a velocity of the influent in the duct by channeling the influent through a portion of the duct having a changing cross-sectional area; and at the head cell, separating the influent from the duct into multiple flows and conveying the multiple flows to the respective multiple trays.

2. The method of claim 1, wherein the act of changing a velocity includes increasing the velocity of the influent to a predetermined velocity.

3. The method of claim 2, wherein after the influent reaches the predetermined velocity, the influent is maintained at substantially the predetermined velocity.

4. The method of claim 2, wherein upon reaching the predetermined velocity, the influent is guided by the duct through a drop in level, and wherein the influent velocity remains substantially constant.

5. The method of claim 1, further comprising conveying the influent through a drop in level with a portion of the duct that slopes downwardly.

6. The method of claim 1, wherein the influent flows from the influent source and through the duct without substantial head loss.

7. A method of conveying influent to a treatment apparatus, comprising:

providing an influent source at a first level above the treatment apparatus;

conveying the influent with a duct along a flow path from the influent source to the treatment apparatus at a second level lower than the first level; and at the treatment apparatus, distributing the influent into multiple independent flows at different levels below the first level while maintaining a velocity of the influent substantially at a predetermined value.

8. A method of conveying influent to a head cell with an entry duct, the method comprising:

providing a first section of the duct adapted to receive an entering open channel flow of influent at a first elevation;

providing a second section of the duct positioned downstream of and sloping downwardly from the first section, the second section having a second section cross sectional area in a plane normal to a direction of flow in the second section that remains substantially constant over a length of the second section;

providing a third section positioned downstream of the second section and terminating in multiple nozzles, the nozzles having a closed cross-section and being arranged at different elevations lower than the first elevation, the nozzles having a total cross sectional area substantially equal to the second section cross sectional area; and distributing a flow received from the first and second sections through the multiple nozzles of the third section as full-pipe flow.

9. The method of claim 8, wherein the flow through the duct occurs at a predetermined design velocity.

10. The method of claim 8, wherein the flow through the duct occurs at a predetermined design velocity of about five feet per second.

* * * * *